Dec. 9, 1924.

A. G. ERDMAN

STUBBLE PULLER

Filed Sept. 22, 1923

1,519,024

2 Sheets-Sheet 1

A. G. Erdman.
INVENTOR

Dec. 9, 1924.　　　　　　　　　　　　　1,519,024
A. G. ERDMAN
STUBBLE PULLER
Filed Sept. 22, 1923　　　2 Sheets-Sheet 2

A.G.Erdman.
INVENTOR

BY

ATTORNEY

WITNESS:

Patented Dec. 9, 1924.

1,519,024

UNITED STATES PATENT OFFICE.

ADOLPH G. ERDMAN, OF WILLOW CITY, NORTH DAKOTA.

STUBBLE PULLER.

Application filed September 22, 1923. Serial No. 664,299.

*To all whom it may concern:*

Be it known that I, ADOLPH G. ERDMAN, a citizen of the United States, residing at Willow City, in the county of Bottineau and State of North Dakota, have invented new and useful Improvements in Stubble Pullers, of which the following is a specification.

This invention relates to an agricultural implement, the general object of the invention being to provide means for lifting stubble and the like from the ground and scattering it over the ground so as to keep the soil from blowing.

Another object of the invention is to provide discs for lifting the stubble and forming it in windrows and a member for scattering the stubble from the windrow.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1:
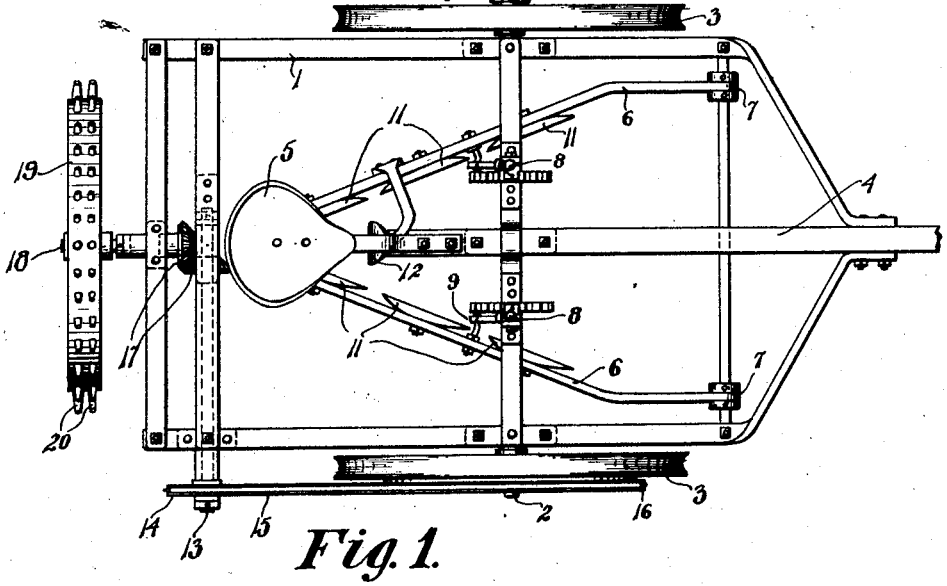
Figure 2:
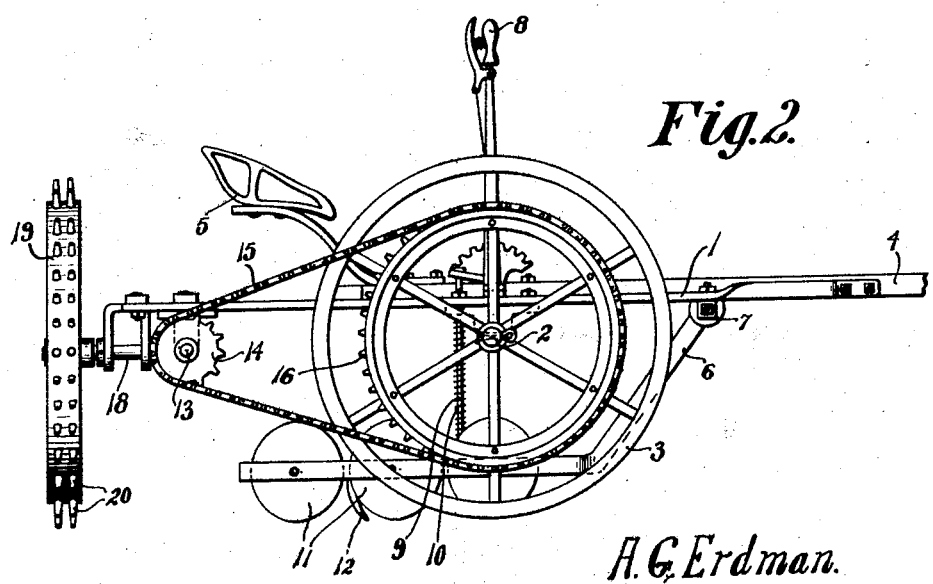
Figure 3:
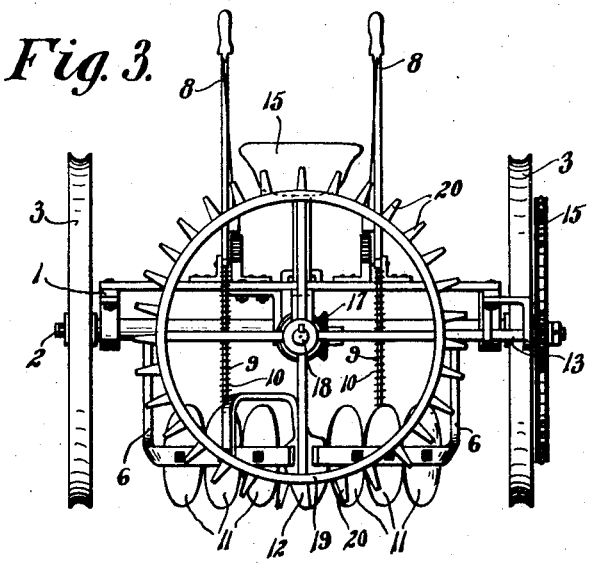
Figure 4:
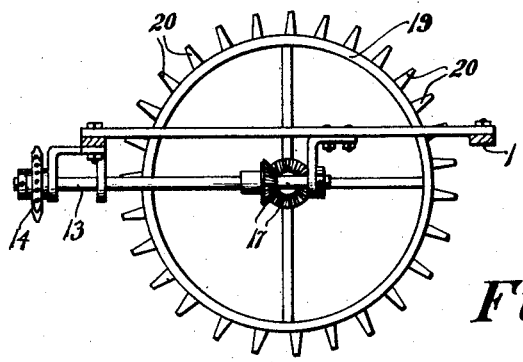

Figure 1 is a plan view of the invention.
Figure 2 is a side elevation.
Figure 3 is an end view.
Figure 4 is a transverse sectional view.

In these views, 1 indicates a frame which is mounted upon the axle 2 which carries the wheels 3. The tongue 4 is fastened to the frame and a seat 5 is supported on the frame. A pair of beams 6 are pivotally connected at their upper ends to the front part of the frame, as shown at 7, and the horizontal portions of these beams converge rearwardly, as shown. Each beam has its rear yieldingly and adjustably supported from the hand lever 8 by the rod 9 and the spring 10. Each beam carries a number of discs 11 and one beam carries a plow 12 which is in line with the space between the rear ends of the beams so as to engage the ground which will not be engaged by the discs. A shaft 13 is journaled in the rear part of the frame and is transversely arranged and carries the sprocket wheel 14 at its outer end which is engaged by a chain 15 which passes over a sprocket 16 on one of the ground wheels. This shaft is connected by the gears 17 to a stub shaft 18 which carries a large distributing wheel 19 which is provided with the spikes 20 on its periphery.

From the above it will be seen that the stubble and other material on the ground will be placed in a windrow by the discs on the beams and the distributor wheel will engage this material so that it will be scattered upon the ground to one side of the machine so as to partially cover the same and thus prevent the plowed soil from being blown away by the wind. I prefer to use the machine right after or during the time the land is plowed so that stubble and trash will be thrown upon the plowed ground.

The hand levers 8 provide means for regulating the depth the discs will enter the ground and the springs will act to hold the discs in engagement with the ground with a yielding pressure.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. An implement of the class described comprising a wheeled frame, discs thereon for removing the stubble from the ground and placing it in a windrow and means for scattering the material in the windrow over the land.

2. An implement of the class described comprising a wheeled frame, discs thereon for removing the stubble from the ground and placing it in a windrow, means for scattering the material in the windrow over the land, such means consisting of a distributor wheel arranged at the rear of the implement, and means for rotating the wheel from one of the ground wheels.

3. An implement of the class described comprising a wheeled frame, a pair of beams supported thereby, said beams having their rear portions converging, a plurality of discs carried by each beam, a distributor wheel arranged at the rear of the implement thereof for engaging the material which has been placed in a windrow by the discs and means for rotating the said wheel from one of the ground wheels.

4. An implement of the class described comprising a wheeled frame, a pair of beams having their front ends pivotally connected with the frame, means for yieldingly connecting the rear of each beam with the frame, such beams including a hand lever for adjusting the beam, a plow carried by one beam for engaging the ground between the rearmost pair of discs, a distributor wheel for engaging the material placed in a windrow by the discs and means for rotating said wheel from one of the ground wheels.

In testimony whereof I affix my signature.

ADOLPH G. ERDMAN.